US010649407B1

(12) United States Patent
Whitten

(10) Patent No.: US 10,649,407 B1
(45) Date of Patent: May 12, 2020

(54) ASTRONOMICAL CALENDAR CLOCK

(71) Applicant: Keith Wesley Whitten, Nevada City, CA (US)

(72) Inventor: Keith Wesley Whitten, Nevada City, CA (US)

(*) Notice: Subject to any disclaimer, the term of this patent is extended or adjusted under 35 U.S.C. 154(b) by 227 days.

(21) Appl. No.: 15/830,365

(22) Filed: Dec. 4, 2017

Related U.S. Application Data

(60) Provisional application No. 62/497,866, filed on Dec. 5, 2016.

(51) Int. Cl.
*G06T 19/00* (2011.01)
*G04B 19/26* (2006.01)
*G09B 27/02* (2006.01)

(52) U.S. Cl.
CPC ......... *G04B 19/262* (2013.01); *G04B 19/268* (2013.01); *G09B 27/02* (2013.01); *G06T 19/006* (2013.01)

(58) Field of Classification Search
CPC ........ G09B 27/02; G09B 27/00; G09B 27/06; G04B 19/26; G04B 19/262; G04B 19/268; G04B 49/00
See application file for complete search history.

(56) References Cited

U.S. PATENT DOCUMENTS

| | | | | |
|---|---|---|---|---|
| 2,985,969 | A * | 5/1961 | Farquhar | G09B 27/02 434/288 |
| 3,766,727 | A * | 10/1973 | Didik | G04B 19/268 368/15 |
| 5,280,458 | A * | 1/1994 | Scott | G04B 19/226 368/24 |
| 5,344,325 | A | 9/1994 | Wang | |
| 5,457,663 | A * | 10/1995 | Mejaski | G04B 19/26 368/15 |
| 5,764,241 | A * | 6/1998 | Elliott | G06F 9/451 345/473 |
| 7,589,740 | B2 * | 9/2009 | Suda | G06T 13/00 345/473 |
| 9,767,613 | B1 * | 9/2017 | Bedikian | G06F 3/147 |
| 2009/0128565 | A1 * | 5/2009 | Wong | G06T 19/00 345/428 |
| 2009/0135676 | A1 * | 5/2009 | Kelley | G04B 49/00 368/15 |

FOREIGN PATENT DOCUMENTS

CH 707412 A2 * 6/2014 ........... G04G 9/0076

* cited by examiner

*Primary Examiner* — Blake A Tankersley

(57) ABSTRACT

An improved astronomical calendar clock mechanism, integrating a sun-centered planetary dial with an earth-centered celestial ring with a fixed orientation number dial located in the earth's equatorial plane, with the sun on a meridian track fixed at 12 on the number dial, and the meridian track indicates the date on a calendar band which is applied to the outside edge of the celestial ring in a plane parallel to the celestial equator, and an hour hand emerging from the earth globe at the center of the celestial ring indicates the time relative to the fixed orientation number dial framing the earth.

11 Claims, 3 Drawing Sheets

ASTRONOMICAL CALENDAR CLOCK

CROSS-REFERENCE TO RELATED APPLICATIONS

This application claims the benefit of provisional application Ser. No. 62/497,866, filed 2016 Dec. 5 by the present inventor.

BACKGROUND—PRIOR ART

The following is a tabulation of some prior art that presently appears relevant:

U.S. Patents

| Pat. No. | Kind Code | Issue Date | Patentee |
| --- | --- | --- | --- |
| 5,457,663 | A | 1993 Dec. 10 | Mejaski |
| 3,766,727 | A | 1971 Aug. 08 | Didik |
| 5,344,325 | A | 1993 May 17 | Wang |

Nonpatent Literature Documents

The Celestial Globe Teacher's Guide. American Educational Products LLC, copyright© 2014.
Meeus, Jean. *Astronomical Algorithms*. Willmann-Bell. 2nd edition, December 1998.

An orrery is a mechanical model of the solar system that illustrates or predicts the relative positions and motions of the sun, planets and moons, usually according to the heliocentric model. The celestial globe is a tangible model of the earth-centered celestial sphere that has for centuries provided a useful model showing the celestial coordinate system used by astronomers all around the world to mark and measure astronomical events taking place from an earth-centered perspective. No prior art has usefully and accurately integrated an earth-centered celestial sphere with a sun-centered orrery, most likely because the celestial sphere as ordinarily conceived is a sphere of infinite diameter, centered on the earth in motion around the sun, and therefore it's not clear how to represent this supposedly infinite structure in a manner which usefully meshes with the scale of the solar system.

A seasonal year is defined by the progression of the sun as it apparently moves along the ecliptic starting from the ascending equinoctial node. Astronomical time is measured relative to the celestial equator while the astronomical date is measured along the ecliptic, which is tilted 23.5° relative to the celestial equator. No prior art has successfully integrated a time dial showing how regular clock time is related to astronomical time, with a date dial showing how the astronomical, seasonal year is related to the civic calendar. Successful integration would include a single, easy to read and understand calendar clock face which doesn't have multiple dials directed at different angles to each other.

The sun-centered Planetime clock of Didik represents the solar system in miniature and has a stellar background. It demonstrates the relative position of each planet in relationship to each other and the constellations can be observed at all times, but it makes no effort to integrate the earth-centered celestial sphere with the sun-centered celestial sphere. The earth in orbit around the central sun is made to spin relative to the sun at the proper rate but there is no time dial surrounding the earth to actually tell the time relative to the spin of the earth.

The single dial of the astronomical time clock of Mejaski also features a sun-centered celestial sphere, in the plane of the invariable plane of the solar system, and includes a useful mechanism demonstrating the circle of illumination projected on the earth as the earth orbits the sun while the tilt of the earth's axis is maintained. This is an effective astronomical calendar but it is lacking a true astronomical clock to measure the passage of time over the course of a day. The earth in orbit around the central sun is set spinning one complete rotation per day relative to the central sun but again there is no time dial associated with the earth's equatorial plane, which is where time is measured. Mejaski suggests that the "time of the day may be displayed by conventional clock hands or a digital display which is made clearly visible only in the segment corresponding to the current month."

The instructions accompanying the *American Educational* 310, *Transparent 12" Celestial Globe* explain how a user can set the current date by positioning the sun along the ecliptic and how to rotate and set the earth to reflect local time. Local noon is when the terrestrial meridian you are located on intersects a line stretched between the center of the earth and the center of the sun on the celestial sphere. Midnight is 12 hours later when the local terrestrial meridian you are located on is facing away from the sun on the other side of earth, and it's easy to find the stars at that time or any time of night based on their location on the celestial sphere relative to the earth globe and your location on it. The planets can also be marked on this celestial globe to accurately reflect the configuration of the solar system at any time and date as seen from the earth. The approximate date is faintly marked along the ecliptic, a form of calendar band, but otherwise no time or date dials are provided with this celestial globe.

The automatic tracking astronomical globe of Wang automates an earth-centered celestial globe, with a solar drive mechanism to accurately move the sun along the ecliptic, and an integral Gregorian calendar band and Chinese lunar calendar band are located in a plane parallel to the ecliptic. The configuration of the earth relative to the sun is accurately displayed but the earth globe at the center carries no time indicator and there is no number dial allowing a user to tell the time of day at a glance. A calendar band is applied along the ecliptic, which marks the progression of the sun, but the user has to move to the side of the globe to read the date instead of being able to use the same view point used to tell the time. The time dial (clock) and the date dial (calendar) are not integrated into a single calendar clock face.

None of the prior art discloses a calendar clock similar to the one disclosed herein.

SUMMARY

A first embodiment of the calendar clock integrates a sun-centered planetary dial, programmed to accurately model the orbital activity of all the planets including the earth, with a modified earth-centered celestial sphere projected around the earth as a celestial ring, which has a fixed-orientation number dial in the plane of the earth's equator which is used to tell time, and an hour hand emerges from the surface of the earth globe at the center of the celestial ring, marking the location of the user of the calendar clock, and as the earth globe spins the hour hand indicates the approximate time of day relative to the fixed orientation number dial, and the sun is fixed at 12 on a meridian track which also serves as the date indicator, indicating the current date on calendar bands located on the north and south ends of the celestial ring.

Advantages

Computers and virtual reality make it possible for this first embodiment of a calendar clock to be accurately built as a virtual object without having to deal with all of the mechanical complexity such a physical mechanism would entail. This embodiment of a calendar clock is made using 3-dimensional computer modeling and animation programs, and manifests on a computer screen as a three dimensional object. A user will be able to access and manipulate this embodiment (accelerating forward or backwards in time; viewing the calendar clock from any angle) through a keyboard and the touch-screen of a computer or smart phone. A virtual embodiment makes it easy to get rid of or make invisible the north and south ends of the celestial sphere, and it eliminate the need for a steel rod spanning the celestial sphere, serving as the axis passing through the earth globe at the center. A celestial ring instead of a celestial sphere allows the user to easily see inside the celestial sphere unobstructed by stars and other markings applied to the surface of the celestial sphere. In addition to the novel features and advantages mentioned above, other features and advantages of the present invention will be readily apparent from the following descriptions of the drawings and exemplary embodiments.

DRAWINGS—FIGURES

DRAWINGS—REFERENCE NUMERALS

Figure 1:
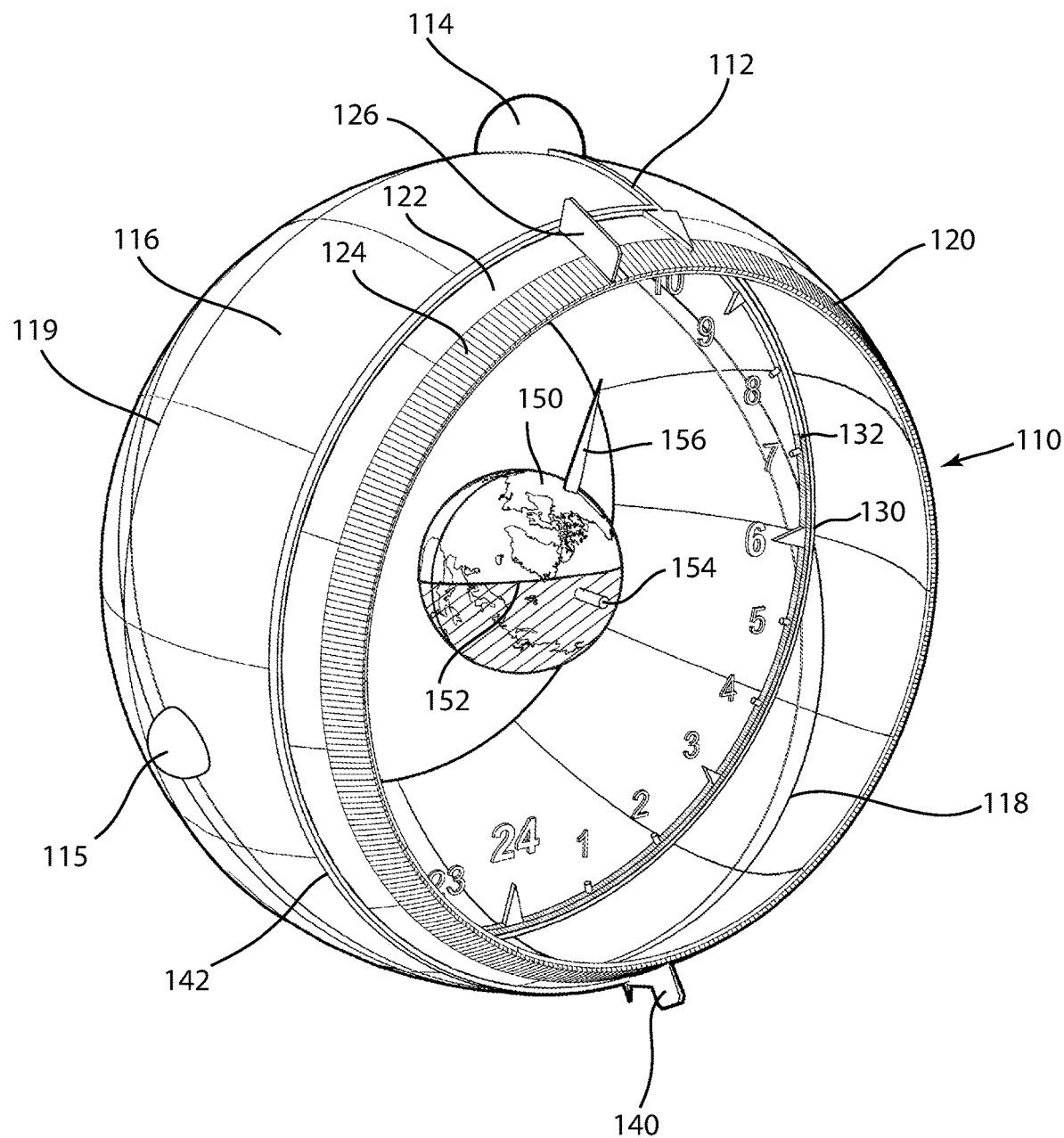
FIG. 1 shows an earth globe with time zone-spanning hour hand at the center of a celestial ring in accordance with one embodiment.
Figure 2:
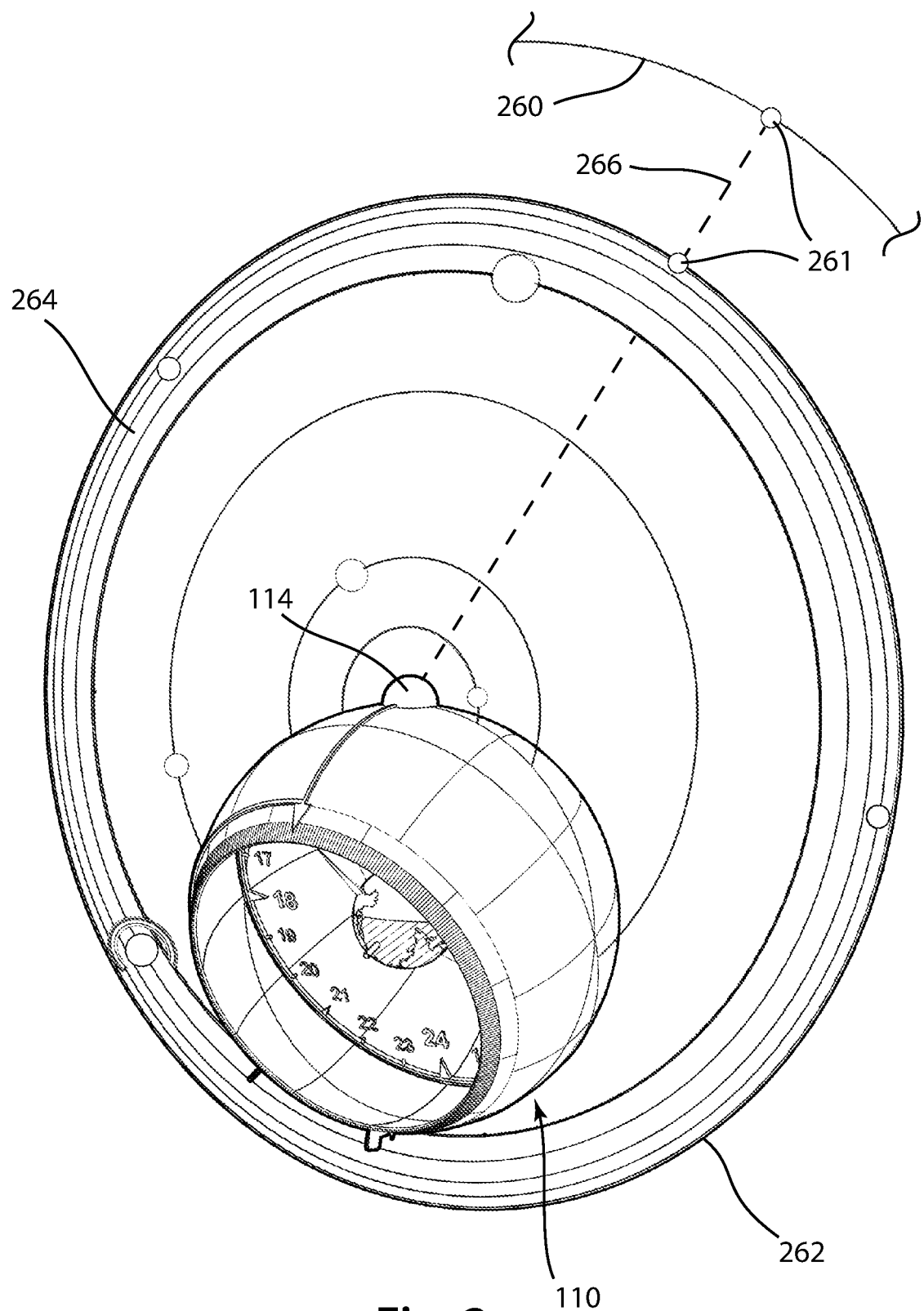
FIG. 2 shows an earth-centered celestial ring framed by a sun-centered planetary dial in accordance with one embodiment.
Figure 3:
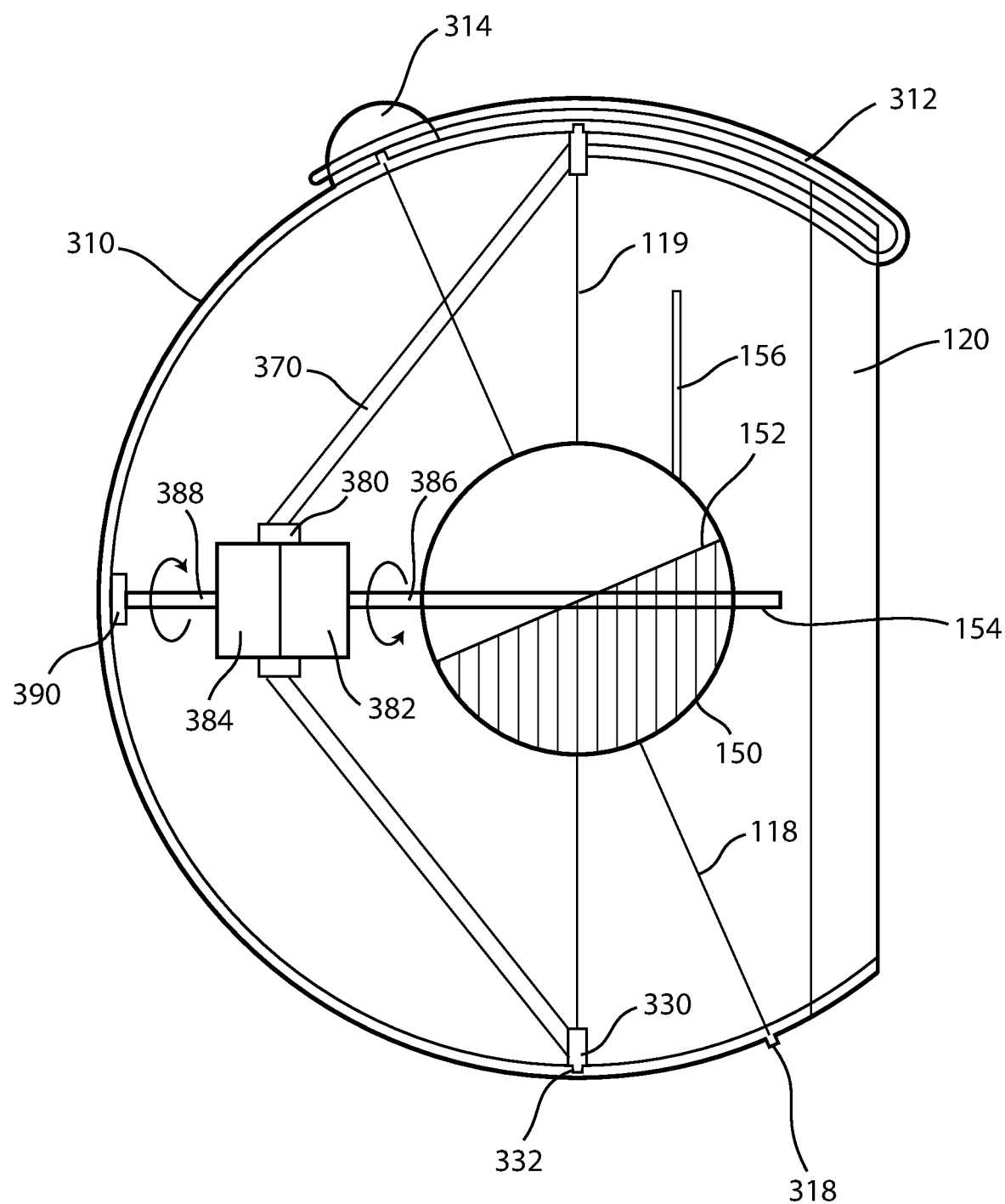
FIG. 3 shows a cross-sectional, side view of one embodiment of a calendar clock.

FIG. 1
110 celestial ring
112 meridian track
114 sun
115 moon
116 zodiac block
118 ecliptic
119 celestial equator
120 calendar band
122 month block
124 day block
126 year banner
130 fixed orientation number dial
132 twilight dial
140 calendar gap handle
142 bracket
150 earth globe
152 circle of illumination
154 axis
156 time zone-spanning hour hand
FIG. 2
260 planetary dial, outside edge
261 pluto
262 representative planetary dial
264 outer planetary ring
266 line connecting planet to sun
FIG. 3
310 celestial bowl
312 modified and extended meridian track
314 illuminating sun hemisphere
318 raised ecliptic track
330 fixed orientation number dial with raised track
332 shallow groove in celestial bowl the length of the celestial equator
370 transparent plastic spoke
380 motor mount
382 north-facing motor
384 south-facing motor
386 earth globe drive shaft
388 celestial bowl drive shaft
390 celestial axis

DETAILED DESCRIPTION—FIG. 1, 2—FIRST EMBODIMENT

One embodiment of a calendar clock is illustrated in FIGS. 1 and 2. This embodiment of a virtual calendar clock has four main components: 1) a planetary dial 260, 2) a celestial ring 110 with calendar bands 120 applied, 3) a fixed orientation number dial 130 with the sun 114 slidably fixed on a meridian track 112 at 12, with the meridian track 112 also serving as the date indicator, and 4) a time of day indicator, most usefully taking the form of a time zone-spanning hour hand 156.

The Planetary Dial

A sun-centered planetary dial 260 is where all of the planets making up the solar system and their orbital pathways are depicted on a round, flat surface representing the invariable plane of the solar system. This planetary dial 260 has a variable but finite diameter of 2 times the distance from the center of the sun to the most distant planet in the solar system, Pluto 261, which is approximately 81 astronomical units from the sun. All of the planets orbit the sun 114 at the center of the planetary dial 260 on circular, concentric pathways at their proportionate average distances from the central sun 114. The planetary dial 260 passes through the center of the earth 150 and where the planetary dial 260 intersects the celestial ring 110 marks the ecliptic 118, which is tilted approximately 23.5° relative to the celestial equator 119.

The planetary dial 260 can be usefully condensed into a smaller structure referred to as the representative planetary dial 262. The orbital pathways of the five outer planets are graphically represented as five concentric, closely spaced circles marked on an outer planetary ring 264, a relatively narrow and flat, two sided ring-shaped structure, which need be no more than 2.5 times larger in diameter than the celestial ring 110, with an inside diameter representing approximately 4.1 astronomical units and an outside diameter of approximately 4.5 astronomical units, centered on the sun 114. The first, inside circle is reserved for Jupiter, the second circle is reserved for Saturn, the third circle is reserved for Uranus, the fourth circle is reserved for Neptune and the fifth, outside circle is reserved for Pluto 261. The outer planetary ring 264 is useful to highlight the orientation of the invariable plane of the solar system relative to the celestial ring 110, and it also usefully represents the orbital activity of the outer five planets on a much smaller structure more closely associated with the scale of the celestial ring 110.

A moon 115 is associated with the planetary dial 260 even though superficially it fits with the celestial ring 110, because it is in orbit around the earth 150. But the moon 115 orbits in a lunar plane tilted 5.1° relative to the plane of the ecliptic 118. The orbit of the moon 115 can be usefully displayed in several different locations. The moon's 115 orbital pathway can be depicted midway between the celestial ring 110 and the surface of the earth globe 150, out of reach of the hour hand 156. The 5.1° tilt of the lunar plane relative to the ecliptic 118 can be modeled and accounted for but it's difficult for a user to determine where exactly the lunar nodes are relative to the ecliptic when the moon's 115 orbital pathway is situated in this location. Alternatively, the lunar pathway can be depicted directly on the celestial ring 110. The lunar nodes are where the lunar pathway crosses the ecliptic 118 and how lunar nodes precess over time can also be represented. Solar eclipses are easily demonstrated on the celestial ring 110 if the sun 114 and moon 115 are depicted at their actual angular diameter on the celestial ring 110 as seen from earth, instead of being greatly enlarged as indicated in the figures.

The Celestial Ring with Calendar Bands Applied

A celestial ring 110 is a modification of a celestial globe, but without changing in any way the essential orientation of the celestial coordinate system. The celestial ring 110 is what is left of the celestial globe after the two north and south ends have been removed, and this celestial ring 110 should be wide enough to show the ecliptic 118 and the orbital pathways of most of the planets and moon 115, which orbit close to the ecliptic 118, so the celestial ring 110 should extend out to at least 30° declination on either side of the celestial equator 119. The celestial ring 110 represents a fixed but variable diameter of 2 times the distance from the center of the actual earth to the center of the actual sun. The two north and south ends of the celestial globe are removed or made invisible above approximately 40° declination, and a calendar band 120 indicating the months and days of a calendar year is applied to the outside surface of both ends of the celestial ring 110 from approximately 30° to 40° declination.

The celestial equator 119 divides the celestial ring 110 in half, located midway between the north and south calendar bands 120 that are applied on the outside surface of the celestial ring 110 from 30° to 40° declination. The plane of the ecliptic 118 is tilted 23.5° relative to the celestial equator 119, so the ecliptic 118 is only 6.5° away from the inside edge of the calendar band 120 at the solstice positions. The 12 signs of the zodiac mark 30° segments of the ecliptic 118, starting with the first segment Aries which begins at the ascending equinoctial node, which marks 0° declination and 0° right ascension on the celestial coordinate system. Mark a point on the ecliptic 118 every 30° starting at the ascending node and then pass a celestial meridian line through each of these 12 points and these meridian lines mark the boundaries of the 12 zodiac blocks 116. Due to the obliquity of the ecliptic 118, these zodiac blocks 116 are contracted in width close to the equinoctial nodes and expanded in width close to the solstice positions. The zodiac blocks 116 help mark the progression of the sun 114 in right ascension measured relative to the axis 154 of earth 150, which is where clock time is measured.

The day blocks 124 of the calendar band 120 are relatively small structures. They also are subject to the contraction near the equinoctial nodes and expansion near the solstice positions, brought about due to the obliquity of the ecliptic 118. It would be impractical to numerically mark the day blocks 124 from 1 to 31 or however many days there are in a month. But some markings are necessary to allow a user of this embodiment to tell the day of the month and the day of the week at a glance. Every fifth day block 124 of a month is therefore marked with one or more "dots." One dot for the 5th day of the month, two dots for the 10th day of the month, up to six dots for the 30th day of the month. The days of a week are indicated by a repeating pattern of light and dark day blocks 124. Two dark day blocks 124 in a row indicate the weekend, followed by 5 light day blocks 124 in a row to indicate the work days of a week. This pattern repeats all around the calendar band 120.

The Fixed Orientation Number Dial with Meridian Track

A fixed orientation number dial 130, with numbers 1-24 consecutively spaced every 15° around the dial 130, with 12 at the top and 24 at the bottom, is located just inside the celestial ring 110, in the plane of the earth's 150 equator. The number dial 130 has an 18-side and a 6-side. A celestial meridian on the surface of the celestial ring 110 is given tangible form as a curved meridian track 112 extending north and south across the width of the celestial ring 110. This meridian track 112 is fixed to the outside edge of the number dial 130 at the 12-mark. The outside edge of the number dial 130 is in sliding contact with the celestial equator 119 marked on the inside surface of the celestial ring 110. This arrangement allows the number dial 130 with the meridian track 112 attached to rotate freely in the plane of the celestial equator 119 relative to the celestial ring 110. The meridian track 112 is made to pass through the sun 114 at the center of the planetary dial 260 and the sun 114 is able to move north and south on this meridian track 112 like a bead on a wire. The sun 114 is always fixed in association with both the meridian track 112 and the ecliptic 118. If the meridian track 112 was a physical structure, the place where the meridian track 112 is fixed to the outside edge of the number dial 130 would obstruct the north and south movement of the sun 114, but because this is a virtual object it is no problem for the sun 114 to move freely back and forth on this meridian track 112, as much as +/−23.5° declination as the sun 114 apparently moves along the ecliptic 118 over the course of a seasonal year. The two ends of the meridian track 112 serve as date indicators which interface with the calendar band 120, allowing the user to read the current month based on which month block 122 the meridian track 112 crosses, and the user reads the current day of the month based on which day block 124 the meridian track 112 crosses.

A calendar gap handle 140 extends out over and across the entire width of the calendar band 120, and the apparent thickness of the handle 140 converges to a thin curved marking edge that is held contiguous with the surface of the calendar band 120, in line with where the meridian track 112 crosses the calendar band 120. The calendar gap handle 140 is rigidly attached to the end of an extendable, retractable circular bracket 142 that emerges out of the 18-side of the meridian track 112 it is fixed to. This bracket 142 is able to completely encircle the calendar band 120, adjacent to the ring of month blocks 122, extending or retracting the bracket 142 as the handle 140 is moved around the calendar band 120. The calendar gap handle 140 can only be rotated through a 360° arc relative to the meridian track 112, and in one direction it extends the bracket 142 from the meridian track 112, and in the other direction it retracts the bracket 142 back into the meridian track 112. It is the presence or absence of this colored bracket 142 adjacent to the month blocks 122 of the calendar band 120 which distinguishes future dates on the calendar band 120 from past dates.

A two-sided year banner 126 marks the end of one calendar year on one side and the beginning of the next calendar year on the other side. The year banner 126 is always fixed in location between December 31 and January 1 on the calendar band 120. The year banner 126 is held perpendicular to the outside surface of the celestial ring 110, large enough to usefully display the digital year, and every time the year banner 126 moves past the calendar gap handle 140 the number of the year displayed on the year banner 126 is adjusted by one to reflect the advancing or retreating digital date.

The sun 114 always illuminates one half of the earth globe 150 at the center of the celestial ring 110. As the sun 114 slides back and forth, north and south on the meridian track 112, the earth's circle of illumination 152 also tilts above and below the earth's axis 154. Where this circle of illumination 152 crosses the latitude circle the hour hand 156 is located on determines when sun rise and sun set occurs. A twilight dial 132 is located on the inside surface of the fixed orientation number dial 130, and displays the proportion of night and day graphically and symmetrically with respect to the 12-24 axis of the number dial 130, indicating the local time of sun rise and sun set. The abrupt transition from light to dark on the twilight dial 132, displayed next to the number dial 130, signals the time of sunset and the abrupt transition from dark to light on the twilight dial 132 signals the time of sun rise, for that specific time, date and location where the hour hand 156 is located.

The Time of Day Indicator

The time of day indicator can usefully take at least two different forms. It always emerges from the surface of the central earth globe 150 at the location of the user of the embodiment of the calendar clock. It can be located automatically by global positioning system. If local solar time is preferred, then the time of day indicator takes the form of a thin gnomon that emerges from the earth 150 along a radial line, long enough and prominent enough to be clearly visible relative to the number dial 130. In this case, the earth globe 150 is programmed to spin at a rate reflecting the actual earth globe's rotation relative to the actual sun, and the user tells the approximate local solar time of day by determining which number of the number dial 130 the gnomon is pointed at.

If mean solar time is preferred, then the time of day indicator takes the form of a time zone-spanning hour hand 156 which emerges from the surface of the earth globe 150 at the center of the celestial ring 110, representing the latitude and time zone of the user of the calendar clock. The hour hand 156 is always held perpendicular to the earth globe's 150 spinning axis 154 and parallel to the earth globe's 150 equatorial plane 119. The hour hand 156 is centered on one of 24 standard time zone meridians, and due to the tapering diamond shape which converges to the earth's axis 154, the base of the hour hand 156 where it emerges from the surface of the earth globe 150 always covers 15° of longitude, no matter what latitude the hour hand 156 emerges from. The earth globe 150 with hour hand 156 is programmed to rotate at a steady rate reflecting mean solar time, one complete rotation every 24 hours relative to the number dial 130, and the user tells the approximate time of day by determining which number the hour hand 156 is pointing at on the number dial 130.

OPERATION—FIGS. 1, 2—FIRST EMBODIMENT

Operation of the Planetary Dial

The planetary dial 260 (FIG. 2) is programmed to model the orbital activity of all of the planets making up the solar system relative to the invariable plane of the solar system, based on sun-centered, sidereal coordinates (celestial longitude and latitude) which can be marked along the outside edge of the planetary dial 260. Each planet's orbital pathway is depicted as a circle on the planetary dial 260, but the orientation of each planet's actual orbital ellipse is accounted for in the programming, including the angle of inclination of the planet's orbital plane relative to the invariable plane, the precession of the axis of the orbital ellipse, and the angle and direction of tilt of each planet's axis relative to the invariable plane, which is always maintained even as the planet orbits the sun 114. Each planet ends up moving around the sun 114 on its circular pathway at a variable rate reflecting the actual planet's elliptical orbit around the actual sun. The programming of the orbital activity on the planetary dial 260 is accomplished by utilizing any number of astronomical algorithms that are available, such as the astronomical algorithms of Meeus.

Note that the planetary dial 260 is not always displayed with this embodiment (FIG. 1) of an earth-centered calendar clock, but the planetary dial 260 is operating in the background all the time to help calculate the constantly changing positions of the sun 114, moon 115 and all the planets as they are displayed on the earth-centered celestial ring 110, most of them apparently orbiting the earth 150 close to the plane of the ecliptic 118, sometimes moving in a retrograde direction because the earth 150 (at the center of the celestial ring 110) is all the while orbiting the sun 114 relative to these other orbiting planets.

The programming is able to create tangible lines linking the center of the earth 150 as it orbits the sun 114 to the center of each of the other planets on the planetary dial 260 as those planets also orbit the sun 114, and wherever the line connecting the other planet to the earth 150 intersects the celestial ring 110, a duplicate of the other planet is placed on the celestial ring 110, and this duplicate planet on the celestial ring 110 will naturally demonstrate the earth-centered, sometimes retrograde activity of that planet as the planets go through their sun-centered, relative movements over time.

The representative planetary dial 262 (FIG. 2) is useful to highlight the orientation of the invariable plane of the solar system relative to the celestial ring 110, and it also usefully represents the orbital activity of the outer five planets on a much smaller structure, the outer planetary ring 264, which is more closely associated with the scale of the celestial ring 110. The programming is able to create tangible lines 266 linking each of the outer five planets on the planetary dial 260 to the central sun 114. Wherever a line 266 connecting the sun 114 to one of the outer five planets intersects the outer planetary ring 264, a duplicate of the planet is placed on the appropriate one of five representative pathways marked on the outer planetary ring 264.

The appropriate astronomical algorithms are employed to move the moon 115 along its orbital pathway around the earth 150 at a rate reflecting the actual moon's orbit around the actual earth. The phase of the moon 115 is an important feature. The light that illuminates the moon 115 in its orbit around the earth 150 is made up of parallel rays of light that seemingly originate from a relatively distant source far beyond the sun 114 on the celestial ring 110. The rays of light illuminating the moon 115 in its orbit are parallel to a line passing through the center of the earth 150 and the center of the sun 114. This results in the moon 115 accurately demonstrating the lunar phases as seen from planet earth.

Operation of the Celestial Ring and Calendar Band

The earth 150 carries the celestial ring 110 with it as it orbits the sun 114 at the center of the planetary dial 260. The direction and angle of tilt of the earth's axis 154 relative to the planetary dial 260 is maintained as the earth 150 orbits the sun 114, and a line passing through the center of the earth 150 and the two equinoctial nodes marked on the celestial ring 110 always stays parallel to itself even as the earth 150 orbits the sun 114. The orbital activity of the earth 150 carrying the celestial ring 110 with it results in the apparent movement of the sun 114 along the ecliptic 118, and the fixed-orientation number dial 130 pivots around the sun 114, rotating relative to the celestial ring 110 at the same rate the earth 150 orbits the sun 114, one complete rotation every seasonal year relative to the celestial ring 110. The programming has to continously adjust the orientation of the embodiment displayed on the screen in order to keep the 12-24 axis of the number dial 130 vertical, with the sun 114 fixed at 12 at the top of the number dial 130 and 24 at the bottom.

A method for accurately marking the day blocks 124 and month blocks 122 on an otherwise blank calendar band 120 follows. Once the planetary dial 260 has been properly programmed using astronomical algorithms, the configuration of the planets on the planetary dial 260 can be properly set to reflect the configuration of the actual solar system for any selected time and date. For instance, the beginning of the year 2000 is selected, starting at midnight for Greenwich, Great Britain where the hour hand 156 is located. Then, set the earth 150 and all the other planets in motion around the sun 114 starting at that date and as the earth 150 (carrying the celestial ring 110 with it) orbits the sun 114 at the center of the planetary dial 260, the programming causes a meridian line to be marked on an otherwise blank calendar band 120, in line with the meridian track 112, exactly every 24 hours at midnight, which coincides with the hour hand 156 pointing directly at the 24 hour mark on the number dial 130. The meridian line marked on the calendar band 120 is programmed to cross just the outside half of the calendar band 120 when just a day block 124 line is required or, said meridian line can be made to cross the entire width of the calendar band 120 to also mark the beginning and ending of a month block 122. The circle on the calendar band 120 separating the day blocks 124 from the month blocks 122 is marked continuously. Leap year is accounted for by adding an extra February 29 day block 124 according to the leap year algorithm, thereby keeping the civic calendar year synchronized with the astronomical or seasonal year. The appropriate number of dots are placed on every multiple of every 5th day block 124 of every month, and the continuous and repeating pattern of two darkly colored day blocks 124 in a row signifying the weekend is followed by 5 light day blocks 124 in a row signifying the 5 days of a work week.

New day blocks 124 and month blocks 122 are incrementally created and seemingly grow out of and away from the meridian track 112 in one direction (clockwise in the northern hemisphere and counter clockwise in the southern hemisphere) at a rate of one new day block 124 every 24 hours, and even when rapidly accelerating the earth 150 through a complete orbit around the sun 114, this will still accurately generate the calendar band 120 faster than the eye can follow, and at the end of a seasonal year of 365.24219 days, the calendar band 120 will be complete, revealing a one year gap in the calendar band 120 across the meridian track 112, where day blocks 124 separated by approximately one year are adjacent to each other on the calendar band 120.

Operation of the Calendar Gap Handle

The calendar band 120 always displays 365.24219 day blocks 124 at any one time. The "future" doesn't actually exist in the same way the past does but a calendar should be capable of showing both past and future months and days. A method for selectively displaying a range of dates on the calendar band 120, ranging between one year of past dates to one year of future dates follows. Instead of marking meridian lines on the calendar band 120 in line with the meridian track 112 as already described, the programming marks meridian lines on the calendar band 120 in line with the edge of the calendar gap handle 140 where the edge is in contact with the calendar band 120. Any relative movement of the calendar gap handle 140 past the calendar band 120 results in the apparent incremental erasing of the calendar band 120 in the direction the calendar gap handle 140 is moving past the calendar band 120, making room on the calendar band 120 for new day blocks 124 to be created by erasing the past calendar band 120 from approximately one year ago at the same rate the calendar band 120 is being created (by marking meridian lines every 24 hours) on the other side of the edge of the calendar gap handle 140.

The edge of the calendar gap handle 140 is thus always fixed in association with the one year gap in the calendar band 120, and the one year gap can be moved anywhere around the calendar band 120 relative to the meridian track 112 just by moving the calendar gap handle 140, which will extend or retract the bracket 142 from the 18-side of the meridian track 112. Any movement of the calendar gap handle 140 past the calendar band 120 which involves extending or retracting the bracket 142 from the meridian track 112 results in the erasing of the calendar band 120 in one direction and the marking of meridian lines separating day blocks 124 and month blocks 122 on the calendar band 120 in the other direction as if the earth 150 itself had moved in orbit around the sun 114 the same angular displacement the calendar gap handle 140 was moved relative to the meridian track 112.

Positioning of the calendar gap handle 140 relative to the meridian track 112 at 12 allows a user to selectively display a range of dates on the calendar band 120 ranging between one year of the past, unmarked by any bracket 142, to one year of the future where all the adjacent dates are marked by the presence of the bracket 142, and any combination in between is also available. When the calendar gap handle 140 is placed at 24 on the number dial 130, the calendar band 120 shows approximately 6 months of future dates on the 18-side of the meridian track 112 and approximately 6 months of past dates on the 6-side of the meridian track 112, a useful arrangement when it comes to utilizing the calendar clock as part of a scheduling program.

Telling the Time and Date

Consider the embodiment of a calendar clock shown in FIG. 1, where the hour hand 156 emerges from the earth globe 150 in northern California, where it is about 11 a.m as indicated by the hour hand 156 relative to the number dial 130. The year banner 126 marks the end of December and the beginning of January. The meridian track 112 crosses the month block 122 of December (not marked on the Fig.) and the tip of the meridian track 112 points at the December 17 day block 124, which is 14 day blocks 124 before the end of the year, where the year banner 126 is located. The calendar gap handle 140 is at 24 and the bracket 142 extends from 12 to 24 on the 18-side of the number dial 130. This embodiment shows six months of future dates and six months of past dates. If this embodiment is showing 11 a.m. in northern California, on Dec. 17, 2017, then the visible side of the year banner 126 would show the number "2018" and January 2018 starts counter clockwise past the year banner 126 and the next month block 122 is marked February and on counter clockwise around the dial. The other side of the year banner 126 would show the number "2017," and that month block 122 is marked December and the next month block 122 is marked November and backwards into the past 6 months, clockwise from the meridian track 112. The one year gap in the calendar band 120 is located at the calendar gap handle 140 at 24, and on the 18-side of the handle 140 is the June 17 day block 124 of 2018, and on the 6-side of the handle 140 is the June 18 day block 124 of 2017. Also, the time of sun rise at that time of year and at the latitude indicated by the hour hand 156 is approximately 7:15 a.m., as indicated by the twilight dial 132, where it turns from dark to light on the inside surface of the number dial 130.

FIG. 2 shows an embodiment of a calendar clock framed by the representative planetary dial 262. The earth 150 (carrying the celestial ring 110 with it) and all the planets orbit the sun 114 at the center of the planetary dial 260 in a counter clockwise direction when observed from a position looking down on the northern hemisphere of earth 150. The orientation of the earth's 150 tilt and the tilt of the celestial ring 110 relative to the planetary dial 260 is maintained throughout this orbital activity such that the sun 114 ends up apparently moving along the ecliptic 118 marked on the celestial ring 110 and the calendar band 120 ends up moving past the meridian track 112 which is fixed at 12 on the number dial 130, and the indicated date on the calendar band 120 advances from the past into the future.

The ability to accelerate this embodiment of a calendar clock into the past or future is an important feature. The programming will create a user interface which allows the user to accelerate the embodiment forwards or backwards in time. When the user clicks on either end of the meridian track 112 which is embellished with north and south arrow head indicators, this action brings up onto the screen a two-directional curved accelerator arrow placed along the outside edge of the calendar band 120, just below and in association with the meridian track 112. A two-way slider on the accelerator arrow allows the user to proportionately accelerate all of the astronomical activity displayed by this embodiment into the past or future, all while a digital display suspended below the accelerator arrow indicates the changing date and or the elapsed time and date from the present. The arrow head indicator at the end of the meridian track 112 blinks as long as the calendar clock is no longer showing the present time, date and associated astronomical configuration of the planets and moon 115. To get the embodiment back to showing the present time, date and the associated configuration of the planets and moon 115, the user simply has to click on the blinking arrow head indicator at the end of the meridian track 112 and the calendar clock automatically reverses all accelerated activity back to the present at which time the indicator stops blinking.

DESCRIPTION—FIG. 3—ADDITIONAL EMBODIMENT

Earlier mention was made of the fact that to fully develop a physical, mechanical embodiment of a calendar clock out of an actual (physical as opposed to virtual) celestial globe would be difficult if not impossible. It is, however, fairly straight forward to build a basic physical embodiment of a calendar clock which demonstrates its most significant features. (For the sake of this discussion, let's give it the approximate same dimensions as the *American Educational* 310, *Transparent* 12" *Celestial Globe*. The Earth is 4" in diameter and the celestial globe is 12" in diameter. Two different versions of this embodiment would need to be offered, one for people living on the north hemisphere of earth and a second version for people living on the south hemisphere of earth. The version described below is for people living on the northern hemisphere of earth.)

This embodiment (FIG. 3) of a physical calendar clock has three main components: 1) a modified celestial globe in the form of a celestial bowl 310, with a one year calendar band 120 applied to the north end, and 2) a fixed orientation number dial 330 with a modified and extended meridian track 312 holding an illuminating sun hemisphere 314, and 3) motive means to rotate the earth globe 150 with hour hand 156 in one direction and the celestial bowl 310 in the opposite direction relative to the number dial 330.

The Modified Celestial Globe

The "front" or north end of a celestial globe is removed above 40° declination, creating a celestial bowl 310. A seasonal year calendar band 120 is applied from 30°-40° declination to the outside surface of the celestial bowl 310, along the north edge. The outside surface of the celestial bowl 310 has a raised, narrow ecliptic track 318 encircling the bowl 310 which serves as a guide rail for the illuminating sun hemisphere 314, which is pressed against the outside surface of the celestial bowl 310 by a modified and extended meridian track 312.

The Fixed Orientation Number Dial with a Modified Meridian Track

The illuminating sun hemisphere 314 is about one inch in diameter, made out of plastic. Inside this sun hemisphere 314 is a battery and light bulb like a conventional flashlight. This sun hemisphere 314 is the source of light which illuminates the earth globe 150 at the center of the celestial bowl 310, providing the circle of illumination 152. The flat surface of the illuminating sun hemisphere 314 is made out of transparent plastic, divided in half by a shallow groove which is designed to accommodate the raised ecliptic track 318 on the outside surface of the celestial bowl 310.

A raised, circular track along the outside edge of the fixed orientation number dial 330 fits in a shallow groove that runs the length of the celestial equator 332 marked on the inside of the celestial bowl 310. This arrangement allows the fixed orientation number dial 330 to rotate freely in the plane of the celestial equator 119 relative to the celestial bowl 310. The meridian track 312 fixed to the number dial 330 at 12 extends beyond the north edge of the celestial bowl 310, curves around the edge and extends back over and across the outside surface of the celestial bowl 310. This extended meridian track 312 on the outside surface of the celestial bowl 310 passes through a hole in the sun hemisphere 314 that penetrates the sun hemisphere 314 from one side to the other, perpendicular to the groove in the flat base of the sun hemisphere 314, allowing the sun hemisphere 314 to move back and forth, north and south on the meridian track 312 like a bead on a wire, guided by the ecliptic track 318. The illuminating sun hemisphere 314 always intersects the meridian track 312 at 12 and the raised ecliptic track 318 on the surface of the celestial bowl 310.

Motive Means to Rotate the Earth Globe and the Celestial Bowl

Like a wheel has spokes that converge to a central hub, the fixed orientation number dial 330 has two or more transparent plastic spokes 370 that extend from the back, south side of the number dial 330 and converge to a motor mount 380, capable of holding a variable speed, north-facing motor 382 and a variable speed, south-facing motor 384, both in line with the axis 154 of the earth globe 150. Both motors 382 and 384 are located inside the celestial bowl 310, half way between the surface of the earth globe 150 and the south end of the celestial bowl 310.

A metal axis passing through the earth globe 150 extends from the south end of the earth globe 150 as an earth globe drive shaft 386 which is driven by the north-facing motor 382. A second metal axis, the celestial globe drive shaft 388 is in line with the first earth globe drive shaft 386. The celestial globe drive shaft 388 extends from the south-facing motor 384 to where it is fixedly attached to the south end of the celestial bowl 310 at the celestial axis 390.

OPERATION—FIG. 3—ADDITIONAL EMBODIMENT

The north-facing motor 382 turns the earth globe 150 at a steady rate of one complete rotation every 24 hours relative to the fixed orientation number dial 330. The hour hand 156 moves at a rate of 15° per hour, and the user tells mean solar time based on what number on the number dial 330 the hour hand 156 is pointing at. The south-facing motor 384 rotates the celestial bowl 310 in the opposite direction at a variable speed relative to the fixed orientation number dial 330, at a rate reflecting the sun's 314 orbit along the ecliptic 318 for the year represented on the calendar band 120 applied to the north end of the celestial bowl 310.

The user tells the date based on where the extended meridian track 312 crosses over the calendar band 120 applied to the outside surface of the north edge of the celestial bowl 310. As the celestial bowl 310 rotates relative to the fixed orientation number dial 330 with the sun 314 fixed at 12 on the meridian track 312, the sloping plane of the ecliptic track 318 (tilted 23.5° relative to the celestial equator 119) translates into a sine wave pulse, moving the sun hemisphere 314 smoothly back and forth (north and south) on the meridian track 312 once every seasonal year, providing an accurately deployed circle of illumination 152 on the earth globe 150 for any time of year.

This embodiment (FIG. 3) seemingly does not make use of a planetary dial 260 as no planets are shown on the celestial bowl 310. It does however make use of the information inherent in the planetary dial 260 (describing the earth's 150 elliptical orbit around the sun 114) to drive the variable speed south-facing motor 384 turning the celestial bowl 310 relative to the number dial 330.

The physical mechanism required to add a moon 115 indicator and or other planetary indicators becomes extremely complex to fit within the space of the celestial bowl 310. If the user moves to a different latitude and or time zone, the hour hand 156 on the earth globe 150 has to be replaced at a new location representing the user's location on the actual earth. Every new year this embodiment requires a new one year calendar band 120 applied to the celestial bowl 310.

This embodiment of a calendar clock (FIG. 3.) requires a base to sit on, like a bean bag or tripod. Rotating the celestial bowl 310 relative to the fixed orientation number dial 330 results in the fixed orientation number dial 330 rotating inside the celestial bowl 310, approximately 1° every day. This embodiment requires the user to adjust the orientation of the calendar clock every few days or so to keep the 12-24 vertical orientation of the calendar clock intact. The user has to actually pick up this embodiment of a calendar clock and adjust it "by eye," so that the sun 314 remains fixed at 12 at the top of the calendar clock. This is not considered a disadvantage, just another somatic reminder that time is passing.

CONCLUSION, RAMIFICATIONS, AND SCOPE

Thus the reader will see that at least one embodiment of the calendar clock provides an intuitive and well-integrated calendar clock face which clearly shows how regular clock time is related to astronomical time, and how the astronomical, seasonal year is related to the civic calendar. The time zone-spanning hour hand of at least one embodiment indicates not just the user's personal and local time but also makes it clear how time is part of a continuum that exists all around the globe. At least one embodiment of the calendar clock shows the retrograde activity of the planets taking place on the celestial ring and provides the user with clear evidence why such activity occurs for both the inner and outer planets. One embodiment featuring the representative planetary dial effectively condenses the planetary activity of the whole solar system down to a scale that usefully frames the celestial ring. At least one embodiment of the astronomical calendar clock provides a radical expansion and enrichment of "regular, ordinary clock time."

Although the description above contains many specificities, these should not be construed as limiting the scope of the embodiments but as merely providing illustrations of some of several embodiments. Several example follow:

One embodiment of a calendar clock has an alarm feature added, with a visible time-of-alarm indicator placed by the user anywhere around the fixed orientation number dial, connected to a handle that extends far enough out of the celestial ring so that a user can "grab" the handle easily, set the alarm at the desired location on the number dial and not have to worry about a.m. vs. p.m. The proximity of the twilight dial to the number dial makes it easy and intuitive to set the alarm relative to the time of sun rise or sun set.

A scheduling program could be usefully integrated with the first embodiment of the calendar clock. Clicking on any visible day block, up to 6 months past or future with the calendar gap handle at 24, will open up on the screen a schedule of events for that day, accurately arrayed around the number dial. Double click on the same day block and the calendar clock and planetary dial will accelerate all activity, into the past or future, until the astronomical configuration of that day is accurately represented on the calendar clock. This allows a user to consider the many planetary and astronomical qualities of the day in question before scheduling events, not just the numerical day of the month.

For those interested in astronomy it is quite natural to show the actual constellations on the celestial ring relative to the celestial coordinate system, the equinoctial nodes and the signs of zodiac. Precession of the equinoctial nodes relative to the background of the stars has resulted in the constellations apparently moving away from the signs they were originally named for thousands of years ago. The progression of the so called great year of approximately 25,800 years can also be shown on one embodiment, making use of the prominent star Regulus that is close to the ecliptic and can serve as a marker relative to the ascending equinoctial node. Other educational features for this embodiment would include the explanation and demonstration of solar and lunar eclipses.

The hour hand can be programmed to recognize political boundaries, so that the base of the hour hand, where it emerges from the surface of the earth globe, actually spans the actual time zone, a product of geography and political boundaries, instead of just 15° centered on the closest time zone meridian. Time zones marked on the earth globe with alternating colored bands converging to the poles is a useful feature.

Additional hands can be added to one or more embodiment to provide more specific measures of time, equivalent to minute and second hands. A base 60 dial can be overlaid with the base 24, but this is a little awkward. If only the base 24 is used, the equivalent of the minute hand advances one number every 2.5 minutes. Let's call this the Leibniz hand where one Leibniz is equal to 2.5 minutes and there are 24 Leibniz in an hour. The equivalent of the second hand advances one number every 6.25 seconds. Let's call this the Plichta hand where one Plichta is equal to 6.25 seconds and there are 24 Plichtas in a Leibniz. A dual 1-12, a.m. and p.m. dial can also be used. The meridian track is fixed to 12 p.m. on the dial, and the hour hand moves up the dial from 12 a.m. to 12 p.m. and down the dial from 12 p.m. to 12 a.m.

At least one embodiment could offer various different calendar bands applied: Jewish, Moslem, Mayan, etc. This will be a useful feature in the exploration of deep history in order to compare and follow different time lines.

Two dimensional embodiments of a virtual calendar clock are useful for representation on small computer screens. The three dimensional celestial ring can be easily and usefully represented in only two dimensions. Even the obliquity of the ecliptic can be represented by showing two circles, one offset from the other which is centered on the center of the earth. The calendar band is shown as a flat ring. The earth globe is show from a viewpoint directly in line with the axis, but the circle of illumination is present even in two dimensions, and it provides the earth with a sense of being spherical.

Time and date are a product of spin and orbit of the planet featured at the center of a celestial ring. One embodiment of a calendar clock could feature an option where other planets besides earth could have an appropriately tilted celestial ring placed around them, where the diameter of the celestial ring is 2 times the distance from the center of the planet to the center of the sun. The planetary dial would take care of the rest of the calculations, and earth would be just one of the planets projected onto the celestial ring. Some time of day indicator would be needed to demonstrate spin of the planet relative to the sun, but the time of day indicator would no longer represent the user's location and presence on that planet.

A combined physical and virtual embodiment of a three dimensional calendar clock could be made, consisting of a real physical, properly illuminated earth globe spinning at the center of a two-sided computer screen taking the shape of a celestial ring, with the earth and hour hand suspended in the middle of the celestial ring by any number of means. An embodiment taking the form of a hologramic projection of the calendar clock is also a possibility.

Thus the scope of the embodiments should be determined by the appended claims and their legal equivalents, rather than by the examples given.

I claim:

1. An astronomical calendar clock, comprising:
   (a) a sun-centered planetary dial where all of the planets making up the solar system and their orbital pathways are depicted on a round, flat surface representing the invariable plane of the solar system, the planetary dial having a diameter of 2 times the distance from the center of the depicted sun to the most distant depicted planet in the solar system, and all of the depicted planets orbit the depicted sun at the center of the planetary dial on circular, concentric pathways at their proportionate average distances from the actual sun, and the planetary dial passes through the center of the depicted earth and where the planetary dial intersects a celestial ring marks the ecliptic, and
   (b) the celestial ring is modified from a celestial globe, the celestial ring having a diameter of 2 times the distance from the center of the depicted earth to the center of the depicted sun, north and south ends of the celestial globe are removed or made invisible above approximately 40° declination from a celestial equator to make the celestial ring, and a calendar band indicating the months and days of a calendar year with month blocks and day blocks is applied to north and south ends of the celestial ring from approximately 30° to 40° declination from the celestial equator, and
   (c) a fixed orientation 24-hour number dial, with a 12-mark at the top and a 24-mark at the bottom, and an outside edge of the number dial slides along an inside surface of the celestial ring along the celestial equator, and wherein each depicted planet, including the depicted earth at the center of the celestial ring, moves around the depicted sun at a rate reflecting the actual planet's elliptical orbit around the actual sun, and the number dial pivots around the depicted sun, rotating relative to the celestial ring at the same rate the depicted earth orbits the depicted sun such that the 12-mark is fixed at an orientation corresponding to a location of the depicted sun, and
   (d) a meridian track extending from north to south along an outer surface of the celestial ring and passing through the center of the depicted sun located at the center of the planetary dial, two ends of the meridian track serve as indicators which interface with the calendar bands, and a user reads the current month based on which month block the meridian track crosses, and the user reads the current day of the month based on which day block the meridian track crosses, and
   (e) a time of day indicator which emerges from a surface of the depicted earth at the center of the celestial ring, representing the location of the user of the calendar-clock, and wherein the depicted earth is rotated at a rate reflecting the actual earth's rotation relative to the actual sun, and the user tells the approximate time of day by determining which number mark the time of day indicator is pointing at on the number dial.

2. The astronomical calendar clock in accordance with claim 1, wherein the time of day indicator is a time zone-spanning hour hand, representing the actual latitude and time zone of the user of the calendar clock, and wherein the depicted earth is rotated at a steady rate of one rotation every 24 hours relative to the number dial, and the user tells the approximate mean solar time based on which number mark the hour hand is pointed at.

3. The astronomical calendar clock in accordance with claim 1, wherein the time of day indicator is accurately located on the depicted earth by a global positioning system.

4. The astronomical calendar clock in accordance with claim 1, wherein one half of the depicted earth at the center of the celestial ring is displayed as if illuminated with parallel light from the depicted sun making a depicted earth's circle of illumination, whereby the depicted earth's circle of illumination tilts north and south of the depicted earth's axis as the depicted sun moves north and south, back and forth on the meridian track.

5. The astronomical calendar clock in accordance with claim 4, wherein the celestial ring is represented as a two dimensional flat surface, and the depicted earth with the axis at the center is also represented as a two dimensional structure, and the depicted earth's circle of illumination, as it tilts above and below the depicted earth's axis over the course of a seasonal year, provides the depicted earth with a sense of volume.

6. The astronomical calendar clock in accordance with claim 1, further including a phase-modelling depicted moon and its orbital pathway which is depicted on the celestial ring, wherein:
  (a) the depicted moon is moved along its orbital pathway depicted on the celestial ring at a rate reflecting the actual moon's orbit around the actual earth, and
  (b) the depicted moon is displayed as if light that illuminates the depicted moon in its orbit around the depicted earth is made up of parallel rays of light that seemingly originate from a relatively distant source far beyond the depicted sun on the celestial ring, the rays of light are parallel to the line passing through the depicted earth and depicted sun,
  whereby the depicted moon accurately demonstrates the lunar phases as seen from the actual earth.

7. The astronomical calendar clock in accordance with claim 1, further including a phase-modelling depicted moon and its orbital pathway which is depicted midway between the celestial ring and the surface of the depicted earth, apparently suspended in space, wherein:
  (a) the depicted moon is moved along its orbital pathway at a rate reflecting the actual moon's orbit around the actual earth, and
  (b) the depicted moon is displayed as if light that illuminates the depicted moon in its orbit around the depicted earth is made up of parallel rays of light that seemingly originate from a relatively distant source far beyond the depicted sun on the celestial ring, the rays of light are parallel to the line passing through the depicted earth and depicted sun,
  whereby the depicted moon accurately demonstrates the lunar phases as seen from the actual earth.

8. The astronomical calendar clock in accordance with claim 1, further including a twilight dial, closely associated with the fixed number dial, wherein:
  (a) the proportion of day light to night time is determined based on the latitude of the time of day indicator and what time of year it is, and
  (b) the twilight dial is located on the inside surface of the number dial, and displays the proportion of day light to night time graphically and symmetrically with respect to the 12-24 axis of the fixed number dial, indicating the local time of sun rise and sun set for that specific time, date and location where the time of day indicator is located.

9. The astronomical calendar clock in accordance with claim 1, wherein the day blocks of the calendar band are distinguished by dots to mark every multiple of the 5th day of a month, whereby these dots enable the user to tell the day of the month at a glance.

10. The astronomical calendar clock in accordance with claim 1, wherein a repeating pattern of 5 light day blocks followed by 2 dark day blocks is used to distinguish the 5 week days from the following 2 days of a weekend, whereby the repeating pattern enables the user to tell the day of the week at a glance.

11. The astronomical calendar clock in accordance with claim 1, wherein the planetary dial further comprises is a representative planetary dial, said representative planetary dial comprising:
  (a) an outer planetary ring which shows the orbital pathways of the actual five outer planets as five concentric circles at a distance from the depicted sun which is shorter than the actual five outer planets' proportionate average distances from the actual sun, said outer planetary ring being flat, two sided ring-shaped structure, centered on the depicted sun, with the first, inside circle depicting the orbital pathway of jupiter, the second circle depicting the orbital pathway of saturn, the third circle depicting the orbital pathway of uranus, the fourth circle depicting the orbital pathway of neptune and the fifth, outside circle depicting the orbital pathway of pluto, and
  (b) whereby the location of each of the depicted outer five planets at their proportionate distances from the actual sun on the planetary dial is projected radially inward towards the depicted sun onto one of the five concentric circles of the outer planetary ring, where a duplicate of the planet is shown,
  whereby this outer planetary ring is useful to highlight the orientation of the invariable plane of the solar system relative to the celestial ring, and also usefully represent the orbital activity of the actual outer five planets on a smaller structure more closely associated with the scale of the celestial ring.

* * * * *